(12) United States Patent
Shaw et al.

(10) Patent No.: US 7,536,947 B2
(45) Date of Patent: May 26, 2009

(54) FILLING APPARATUS AND METHODS FOR USING SAME

(75) Inventors: Craig William Shaw, Elmwood (CA); Randy Alan Lengyell, Gorrie (CA)

(73) Assignee: Parrish & Heimbecker, Limited, Winnipeg (CA)

( * ) Notice: Subject to any disclaimer, the term of this patent is extended or adjusted under 35 U.S.C. 154(b) by 1206 days.

(21) Appl. No.: 10/807,171

(22) Filed: Mar. 24, 2004

(65) Prior Publication Data
US 2005/0211107 A1    Sep. 29, 2005

(51) Int. Cl.
*A21C 9/06* (2006.01)
(52) U.S. Cl. ...................... 99/450.7; 99/450.8
(58) Field of Classification Search ................ 99/450.7, 99/450.1, 450.2, 450.3, 450.4, 450.5, 450.6, 99/450.8
See application file for complete search history.

(56) References Cited

U.S. PATENT DOCUMENTS

| | | | |
|---|---|---|---|
| 3,870,806 A | 3/1975 | Capossela et al. | |
| 4,039,691 A | 8/1977 | Hildebolt | |
| 4,102,257 A | 7/1978 | Gonzalez | |
| 4,175,486 A | 11/1979 | Hildebolt et al. | |
| 4,454,804 A | 6/1984 | McCulloch | |
| 4,530,848 A | 7/1985 | Bannon et al. | |
| 4,861,606 A | 8/1989 | Jensen | |
| 5,186,098 A * | 2/1993 | Miller | 99/494 |
| 5,417,992 A * | 5/1995 | Rizvi et al. | 426/283 |
| 5,673,612 A | 10/1997 | Svendsen | |
| 6,183,799 B1 * | 2/2001 | Wu et al. | 426/516 |
| 6,321,642 B1 * | 11/2001 | Ou-Young | 99/494 |
| 6,386,748 B1 | 5/2002 | Huber et al. | |
| 6,509,049 B1 | 1/2003 | Parsons et al. | |
| 6,689,406 B2 * | 2/2004 | Kuehl et al. | 426/303 |
| 7,040,974 B2 * | 5/2006 | Shefet | 452/35 |

* cited by examiner

*Primary Examiner*—Daniel L Robinson
(74) *Attorney, Agent, or Firm*—Bereskin & Parr LLP

(57) ABSTRACT

The present invention provides for an apparatus for filling a food material into a cavity of an object. The apparatus has a conduit having a conduit inlet port, a conduit outlet port, and an interior passageway extending between the conduit inlet port and the conduit outlet port. The conduit is adapted to permit passage of a dry food material through the interior passageway from the conduit inlet port to the conduit outlet port. The apparatus also has a fluid injector fluidly connected to the conduit and to a fluid source. The fluid injector is adapted to permit injection of a fluid into the interior passageway of the conduit for mixing with the dry food material passing therethrough to obtain a wet food material. The apparatus also has a nozzle having a nozzle inlet port, a nozzle outlet port, and an interior passageway extending between the nozzle inlet port and the nozzle outlet port. The nozzle is fluidly connected to the conduit and the fluid injector. The nozzle outlet port is adapted to fill the wet food material into the cavity of the object. A method for filling the cavity of the object with the food material is also disclosed. An object having a cavity containing a food material when filled by the method in accordance with the present invention is also disclosed.

29 Claims, 3 Drawing Sheets ated into the dry stuffing. The staling process involves a physical change commonly referred to as starch retrogradation in which the starch molecules are reorganized into an ordered crystalline structure. When a liquid is subsequently added to the staled breadcrumbs under the sheer stresses applied during the pre-mixing step, the starch molecules absorb the liquid and become unstable (i.e., the ordered crystalline structure of the starch molecules break down and the breadcrumbs become soggy). This problem is made worse when the pre-mixed stuffing is not used immediately after being prepared. The pre-mixed stuffing is loaded into a hopper, and subsequently filled into the cavity of the raw meat product.

FILLING APPARATUS AND METHODS FOR USING SAME

FIELD OF THE INVENTION

The present invention relates to an apparatus for filling poultry with a stuffing material, and a method of using same.

BACKGROUND OF THE INVENTION

A cooked meat product having a cavity containing a stuffing is a very popular food item. It is desirable to cook the raw meat product in intimate contact with the stuffing to obtain optimal stuffing characteristics (e.g., proper texture, moisture content and flavor). Accordingly, manufacturers often fill the cavity of the raw meat product with stuffing prior to packaging to improve food-handling, safety, and to simplify the preparation required by the end user.

Conventional filling methods typically include a step for pre-mixing a dry stuffing (e.g. a farinaceous ingredient, such as staled breadcrumbs or the like, spices and/or vegetables) with a liquid (e.g. water). Pre-mixing the dry stuffing with a liquid tends to cause the breadcrumbs to lose their original shape and form, resulting in a soggy stuffing with an undesirable texture. This phenomenon can be best explained at the molecular level. A staling process is typically used to manufacture the staled breadcrumbs that are incorpor

SUMMARY OF THE INVENTION

The present invention provides for an apparatus for filling a food material into a cavity of an object, having:

a) a conduit having a conduit inlet port, a conduit outlet port, and an interior passageway extending between the conduit inlet port and the conduit outlet port, the conduit adapted to permit passage of a food material having a first moisture content through the interior passageway from the conduit inlet port to the conduit outlet port;

b) a fluid injector fluidly connected to the conduit and to a fluid source, the fluid injector adapted to permit injection of a fluid into the interior passageway of the conduit for mixing with the food material passing therethrough to obtain a food material having a second moisture content greater than the first moisture content;

c) a nozzle having a nozzle inlet port, a nozzle outlet port, and an interior passageway extending between the nozzle inlet port and the nozzle outlet port, the nozzle being fluidly connected to the conduit and the fluid injector, the nozzle outlet port being adapted to fill the food material having the second moisture content into the cavity of the object.

In one aspect of the invention, the apparatus has an axially rotatable screw located within the conduit, fluid injector and nozzle for advancing the food material towards and through the nozzle outlet port.

In another aspect of the invention, the fluid injector has an annular ring surrounding the conduit outlet port, the conduit has a plurality of apertures positioned around its circumference adjacent the conduit outlet port, and the conduit outlet port is received in the fluid injector so that the plurality of apertures are located within the annular ring.

In another aspect of the invention, the nozzle outlet port is restricted to generate back pressure in the conduit when the food material having the second moisture content passes through the nozzle outlet port.

In another aspect of the invention, the fluid injector has a valve between the conduit and the fluid source for controlling fluid flow through the injector, the valve being biased to a closed position and adapted to permit fluid flow through the fluid injector when the back pressure generated in the conduit by the food material having the second moisture content passing through the nozzle outlet port exceeds a predetermined value.

In another aspect of the invention, the valve includes a diaphragm and a valve seat, the diaphragm being in contact with the valve seat while in the closed position to prevent fluid flow through the fluid injector, and the predetermined value is equal to the minimum back pressure on the downstream side of the valve seat required to lift the diaphragm from the valve seat to permit fluid flow through the fluid injector and into the interior passageway of the conduit.

In another aspect of the invention, the apparatus has a hopper fluidly connected to the conduit for receiving the food material having the first moisture content and guiding it into the conduit.

The present invention also provides for a method for filling a food material into a cavity of an object. The method includes the steps of:

a) advancing a food material having a first moisture content through an interior passageway of a conduit from a conduit inlet port towards a conduit outlet port;

b) introducing a fluid into the interior passageway and mixing the fluid with the food material to obtain a food material having a second moisture content greater than the first moisture content; and c) filling the food material having the second moisture content into the cavity of the object.

In one aspect of the invention, the fluid is introduced in step (b) into the conduit by passing it through a fluid injector, the fluid injector having an annular ring surrounding the conduit outlet port, the conduit has a plurality of apertures positioned around its circumference adjacent the conduit outlet port, and the conduit outlet port is received in the fluid injector so that the plurality of apertures are located within the annular ring.

In another aspect of the invention, the method includes the step of increasing the back pressure in the conduit prior to step (b).

In another aspect of the invention, the fluid is introduced in step (b) into the interior of the conduit when the back pressure in the conduit exceeds a predetermined value.

The object may be a raw meat product such as poultry, fish, or other seafood, or a non-edible object such as a container or a bag.

The present invention also provides for an object having a cavity filled with a food material when filled by a method in accordance with the present invention.

Other features and advantages of the present invention will become apparent from the following detailed description. However, it should be understood, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention and in which.

DETAILED DESCRIPTION OF THE INVENTION

Figure 1:
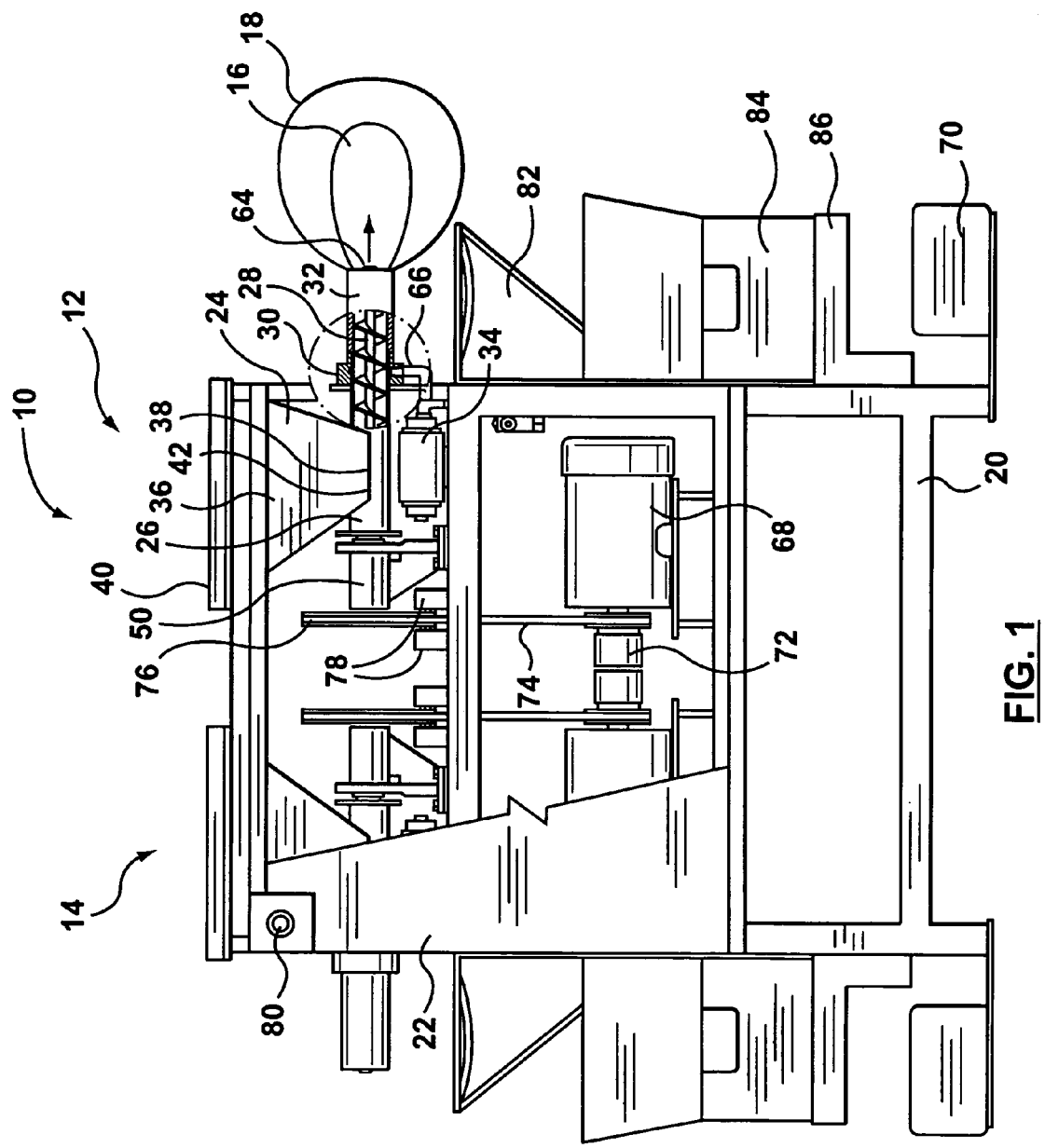
FIG. 1 is a side elevational partial cut-away view of a filling apparatus according to the present invention.
Figure 2:
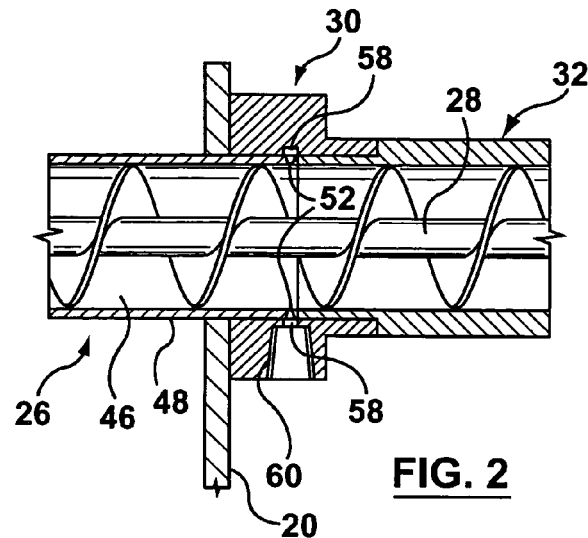
FIG. 2 is an enlarged cross-sectional view of a portion of the filling apparatus of FIG. 1.

Referring first to FIG. 1, a side elevational partial cut-away view of a filling apparatus made in accordance with the present invention is shown generally at 10. The filling apparatus 10 is shown with two separate filling stations 12 and 14, each of which are independently operated. Each filling station 12, 14 is designed to receive a dry food material; introduce a fluid for mixing with the dry food material; intimately mix the dry food material and the fluid to produce a wet food material; and fill the wet food material into a cavity 16 of an object 18. Herein, "dry food material" means a foodstuff having a relatively low moisture content, such as breadcrumbs, which is insufficient to use as a poultry stuffing. Herein, "wet food material" means a foodstuff having a higher moisture content than the dry food material, in the range suitable for use as a poultry stuffing.

Each filling station 12 and 14 has a hopper 24, a conduit 26, an axially rotatable screw 28, a fluid injector 30, a nozzle 32, and a valve 34. The valve 34 is fluidly connected to a water supply (not shown) via a conduit (not shown).

The hopper 24 has a hopper inlet port 36 and a hopper outlet port 38. The hopper outlet port 38 is fluidly connected to the conduit 26. The hopper 24 is adapted to receive the dry food material, and guide it into the conduit 26. The hopper 24 can be of any suitable design as is known in the art. A safety screen 40 may be positioned over the hopper inlet port 36 to prevent injuries to workers using the apparatus.

Referring now to FIGS. 2-5, the conduit 26 has a conduit inlet port 42 (shown in FIG. 1), a conduit outlet port 44, an interior passageway 46, and an exterior wall 48. The conduit 26 is adapted to permit the passage of the dry food material through the interior passageway 46 from the conduit inlet port 42 towards the conduit outlet port 44. The axially rotatable screw 28 is located within the conduit 26, the fluid injector 30 and the nozzle 32 for advancing the food material therethrough. The conduit 26 may be held in place by a conduit support 50 (shown in FIG. 1).

Figure 3:
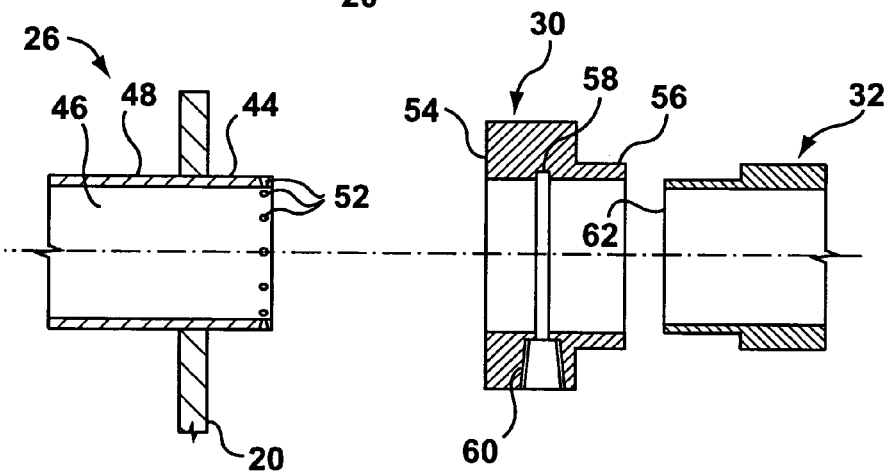
FIG. 3 is an enlarged exploded cross-sectional view of the portion of the filling apparatus of FIG. 2, without an axially rotatable screw.
Figure 4:
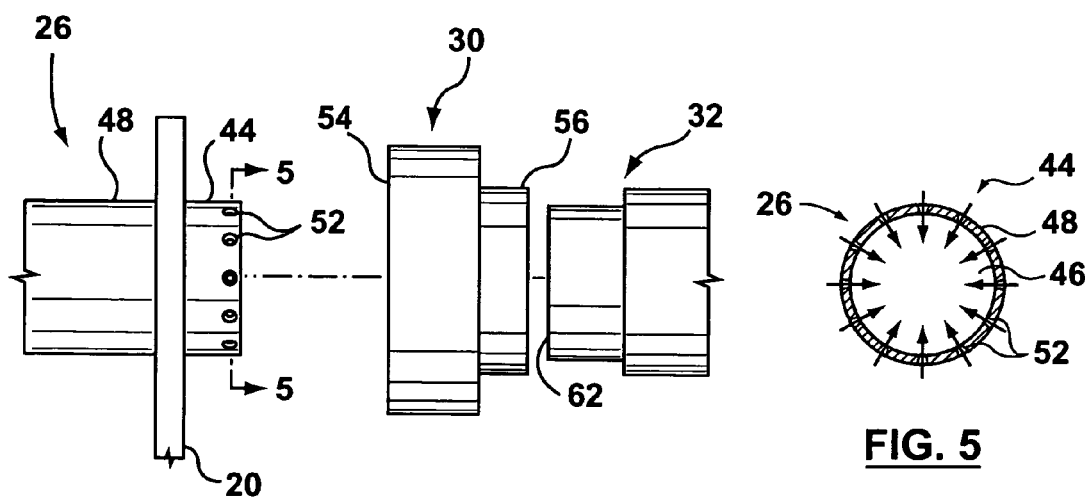
FIG. 4 is an enlarged exploded side elevational view of the portion of the filling apparatus of FIG. 2, without the axially rotatable screw.
Figure 5:
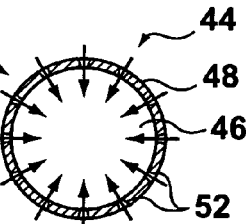
FIG. 5 is an enlarged cross-sectional view of a conduit of FIG. 4 taken along line 5-5.

In a preferred embodiment, the conduit 26 has a plurality of apertures 52 positioned around the circumference adjacent the conduit outlet port 44 (shown in FIGS. 3 and 4). The fluid injector 30 has a food inlet port 54 and a food outlet port 56.

The fluid injector 30 fluidly joins the conduit 26 and the nozzle 32. The fluid injector 30 has an annular ring 58 and a fluid inlet port 60 in fluid communication with the annular ring 58. The diameter of the annular ring 58 is slightly larger than the diameter of the conduit outlet port 44. The conduit outlet port 44 is received in the food inlet port 54 of the fluid injector 30 and seats against a nozzle inlet port 62 of the nozzle 32. In this configuration, the apertures 52 are in fluid communication with the annular ring 58. This permits injection of the fluid through the fluid inlet port 60, into the space defined by the annular ring 58 and the exterior wall 48 of the conduit 26, and through the apertures 52 into the interior passageway 46 of the conduit 26 into contact with the dry food material. This arrangement permits uniform injection of the fluid into the conduit 26 to obtain a well-mixed wet food material.

The nozzle 32 has a nozzle inlet port 62 (see FIGS. 3 and 4) and a restricted nozzle outlet port 64 (see FIG. 1). The nozzle 32 is fluidly connected to the conduit 26 and positioned downstream of the fluid injector 30. The nozzle outlet port 64 is restricted to create back pressure in the conduit 26 as the dry food material passes through the nozzle outlet port 64. This assists in thoroughly mixing the dry food material with the fluid to form the wet food material, as the dry food material passes through the fluid injector 30. The nozzle outlet port 64 is adapted to fill the wet food material into the cavity 16 of the object 18.

In one aspect of the invention, the nozzle 32 can be an ultra high molecular weight nozzle as is known in the art. The nozzle 32 can be made of a polymer, such as polyethylene, which preferably is corrosion resistant, self-lubricating, wear resistant, and relatively light weight. The nozzle 32 may be suitably shaped and sized to allow the axially rotatable screw 28 to operate within it to advance the wet food material out of the nozzle outlet port 64.

Figure 6:
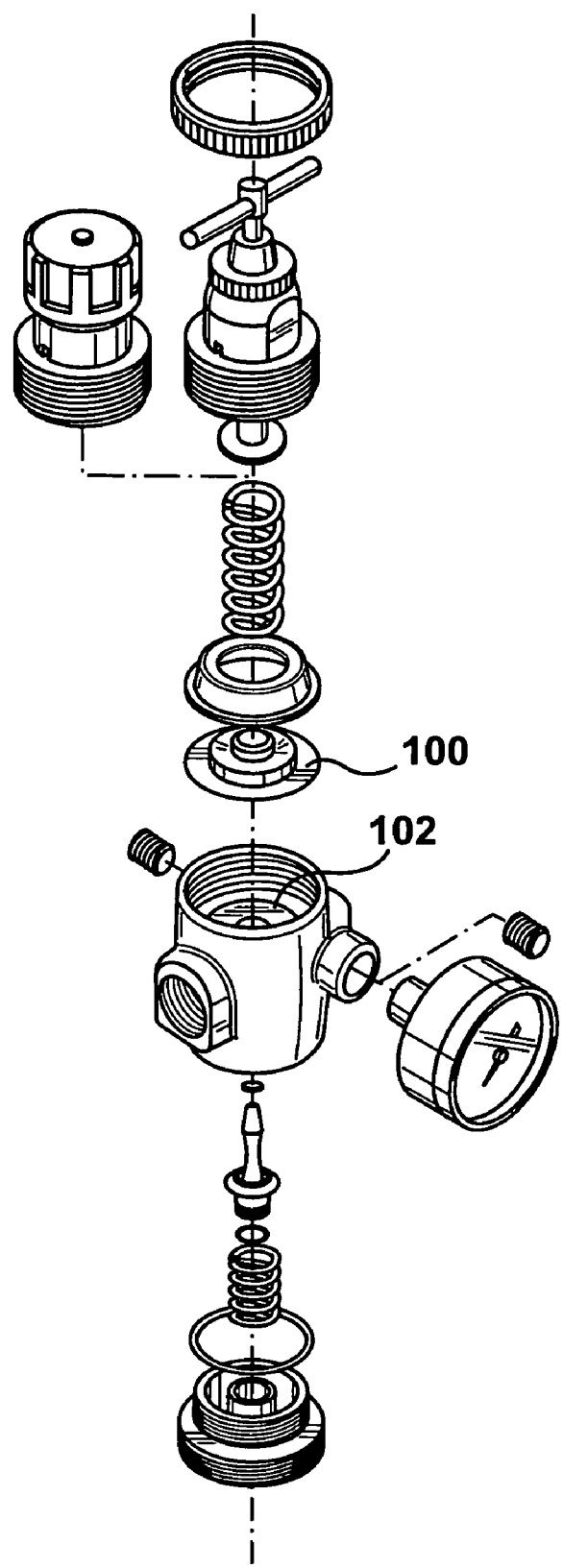
FIG. 6 is an exploded perspective view of a diaphragm valve.

Referring now to FIG. 1, the valve 34 is fluidly connected to the fluid injector 30 via conduit 66 for controlling fluid flow through the fluid injector 30. In one aspect of the invention, the valve 34 comprises a diaphragm 100 and a valve seat 102 (see FIG. 6). The valve 34 is biased to a closed position, so that the diaphragm 100 is in contact with the valve seat 102 to prevent fluid flow through the fluid injector 30. The valve 34 permits fluid flow through the fluid injector 30 when the back pressure generated by the wet food material passing through the restricted nozzle outlet port 64 exceeds a predetermined value (e.g. the minimum back pressure on the downstream side of the valve seat 102 required to lift the diaphragm 100 from the valve seat 102 to permit fluid flow through the fluid injector 30 and into the conduit 26). The valve 34 continues to permit fluid flow through the injector 30 until the back pressure falls below the predetermined value. Preferably, the minimum back pressure is between about 5 lbs to about 25 lbs, more preferably between about 10 lbs to about 20 lbs, and most preferably about 15 lbs.

In another aspect of the invention, a pressure sensor (not shown) in conjunction with a valve can be used to control fluid flow through the fluid injector 30. Such arrangements are known in the art.

In a preferred embodiment, the filling apparatus 10 is driven by an A/C motor 68 and controlled by an actuator 70 (e.g. a foot pedal). Filling apparatus 10 can receive power from any source of current including, but not limited to: an electrical outlet, a battery, a fuel cell, or any other power device known in the art. Preferably, power is supplied by means of a wall plug (not shown) that is electrically connected to the A/C motor 68 via electrical wires (not shown). When the foot pedal 70 is activated, a disc brake 78 is released from a driven pulley 76 and power is supplied to the A/C motor 68 so that it rotates to turn a drive clutch 72. The drive clutch 72 rotates to turn a drive belt 74, which in turn causes the driven pulley 76 to rotate. The driven pulley 76 causes the axially rotatable shaft 28 to rotate so as to advance the dry food material through the interior passageway 46 of the conduit 26 towards the conduit outlet port 44. When the foot pedal 70 is deactivated, the A/C motor is shut off which stops the rotation of the axially rotatable screw 28 and also engages the disc brake 78. The filling apparatus 10 can be designed to have an emergency shut off button 80 that is electrically connected to the A/C motor 68 via electrical wires (not shown). When the emergency shut off button 80 is depressed, the A/C motor is shut off which stops the rotation of the axially rotatable screw 28 and also engages the disc brake 78.

In an alternative embodiment, the filling apparatus 10 can be manually operated (e.g. a handle can be connected to the axially rotatable screw 28 to advance the dry food material through the interior passageway 46 of the conduit 26).

A work support shelf 82 can be provided so that an individual can rest the object 18 on a shelf while it is being filled at the filling station 12. Furthermore, a removable product overflow hopper 84 may be provided to collect any of the food material that may fall while the filling station 12 is in use. A hopper support shelf 86 may also be provided to support the removable product overflow hopper 84.

The following is a detailed discussion of a preferred mode of operation. Initially, an individual provides a dry food material into the hopper inlet port 36. The dry food material flows into the conduit inlet port 42 by the force of gravity. Next, the individual depresses the foot pedal 70 to release the disc brake 78 and power the A/C motor 68 to cause the drive clutch 72 to rotate. The drive clutch 72 causes the drive belt 74 to rotate, which in turn causes the driven pulley 76 to rotate. The driven pulley 76 rotates the axially rotatable shaft 28 so as to advance the dry food material through the interior passageway 46 of the conduit 26 towards the conduit outlet port 44. As the dry food material passes through the restricted nozzle outlet port 64, the back pressure in the conduit 26 increases. When the back pressure in the conduit 26 exceeds a predetermined value (e.g., the minimum back pressure on the downstream side of the valve seat 102 required to lift the diaphragm 100 from the valve seat 102 to permit fluid flow through the fluid injector 30), a fluid (e.g. water) under pressure passes through the valve 34 and into the fluid inlet port 60. The fluid then passes into the annular ring 58, and through the apertures 52 into contact with the dry food material (see FIG. 5). This moisturizes the dry food material to form a wet food material, suitable for use as a poultry stuffing. The action of the fluid injection, combined with the dry food material passing along the interior of the conduit, mixes the fluid and the dry food material to form a uniform wet food material. The wet food material is then passed through the restricted nozzle outlet port 64 and ultimately filled into the cavity 16 of the object 18. It is understood that the fluid will be introduced into the conduit 26 as long as the back pressure in the conduit 26 exceeds the predetermined value. Once the cavity 16 of the object 18 is full, the foot pedal is deactivated which shuts off the A/C motor 68 and also engages the disc brake 78. Accordingly, the axially rotatable screw 28 stops rotating and the back pressure in the conduit 26 falls below the predetermined value which turns off the fluid injection.

In one aspect of the invention, the food material is a stuffing. Preferably, the moisture content of the dry food material is between about 5% w/w to about 10% w/w, more preferably between about 5% w/w to about 7% w/w, and most preferably about 5% w/w. Preferably, the moisture content of the wet food material is between about 45% w/w to about 55% w/w, more preferably between about 50% w/w to about 55% w/w, and most preferably about 50% w/w.

In one aspect of the invention, the object is a raw meat product having a cavity. The raw meat product can include any type of edible bird or mammal. Examples include, but are not limited to, poultry such as chicken, turkey, goose, and duck, and red meat such as beef, lamb, buffalo, venison, and pork. In another aspect of the invention, the object is a fish or seafood product having a cavity. The fish or seafood product can include any type of edible fish or seafood. Examples include, but are not limited to, salmon, tuna, lobster, and crab. In another aspect of the invention, the object is a container having a cavity (e.g. a bag).

While the above description constitutes the preferred embodiments, it will be appreciated that the present invention is susceptible to modification and change without departing from the fair meaning of the proper scope of the accompanying claims. For example, it is to be appreciated that the apparatus can be used in a non-food related application where a dry material is hydrated and subsequently filled into a cavity of a container or the like.

The invention claimed is:

1. An apparatus for filling a food material into a cavity of an object, comprising:
   a) a conduit having a conduit inlet port, a conduit outlet port, and an interior passageway extending between the conduit inlet port and the conduit outlet port, the conduit adapted to permit passage of a food material having a first moisture content through the interior passageway from the conduit inlet port to the conduit outlet port;
   b) a fluid injector fluidly connected to the conduit and to a fluid source, the fluid injector adapted to permit injection of a fluid into the interior passageway of the conduit for mixing with the food material passing therethrough to obtain a food material having a second moisture content greater than the first moisture content, the fluid injector has an annular ring surrounding the conduit outlet port, the conduit has a plurality of apertures positioned around its circumference adjacent the conduit outlet port, and the conduit outlet port is received in the fluid injector so that the plurality of apertures are located within the annular ring; and
   c) a nozzle having a nozzle inlet port, a nozzle outlet port, and an interior passageway extending between the nozzle inlet port and the nozzle outlet port, the nozzle being fluidly connected to the conduit and the fluid injector, the nozzle outlet port being adapted to fill the food material having the second moisture content into the cavity of the object.

2. An apparatus according to claim 1, further comprising an axially rotatable screw located within the conduit, fluid injector and nozzle for advancing the food material towards and through the nozzle outlet port.

3. An apparatus according to claim 1, wherein the nozzle outlet port is restricted to generate back pressure in the conduit when the food material having the second moisture content passes through the nozzle outlet port.

4. An apparatus according to claim 3, wherein the fluid injector additionally comprises a valve between the conduit and the fluid source for controlling fluid flow through the injector, the valve being biased to a closed position and adapted to permit fluid flow through the fluid injector when the back pressure generated in the conduit by the food material having the second moisture content passing through the nozzle outlet port exceeds a predetermined value.

5. An apparatus according to claim 4, wherein the valve comprises a diaphragm and a valve seat, the diaphragm being in contact with the valve seat while in the closed position to prevent fluid flow through the fluid injector, and the predetermined value is equal to the minimum back pressure on the downstream side of the valve seat required to lift the diaphragm from the valve seat to permit fluid flow through the fluid injector and into the interior passageway of the conduit.

6. An apparatus according to claim 1, further comprising a hopper fluidly connected to the conduit for receiving the food material having the first moisture content and guiding it into the conduit.

7. A method for filling a food material into a cavity of an object, comprising:
 a) advancing a food material having a first moisture content through an interior passageway of a conduit from a conduit inlet port towards a conduit outlet port;
 b) introducing a fluid into the interior passageway and mixing the fluid with the food material to obtain a food material having a second moisture content greater than the first moisture content, the fluid is introduced into the conduit by passing it through a fluid injector, the fluid injector having an annular ring surrounding the conduit outlet port, the conduit has a plurality of apertures positioned around its circumference adjacent the conduit outlet port, and the conduit outlet port is received in the fluid injector so that the plurality of apertures are located within the annular ring; and
 c) filling the food material having the second moisture content into the cavity of the object.

8. A method according to claim 7, further comprising the step of increasing the back pressure in the conduit prior to step (b).

9. A method according to claim 8, wherein the fluid is introduced in step (b) into the interior of the conduit when the back pressure in the conduit exceeds a predetermined value.

10. A method according to claim 7, wherein the object is a raw meat product.

11. A method according to claim 10, wherein the raw meat product is poultry.

12. A method according to claim 7, wherein the object is a fish or seafood product.

13. A method according to claim 7, wherein the object is a container.

14. A method according to claim 13, wherein the container is a bag.

15. A method according to claim 7, wherein the food material is a stuffing.

16. A method according to claim 15, wherein the first moisture content is between about 5% w/w to about 10% w/w.

17. A method according to claim 16, wherein the second moisture content is between about 45% w/w to about 55% w/w.

18. An object having a cavity containing a food material when filled by the method of claim 7.

19. An object according to claim 18, wherein the object is a raw meat product.

20. An object according to claim 19, wherein the raw meat product is poultry.

21. An object according to claim 18, wherein the object is a fish or seafood product.

22. An object according to claim 18, wherein the object is a container.

23. An object according to claim 22, wherein the container is a bag.

24. An object according to claim 18, wherein the food material is a stuffing.

25. An apparatus for filling a food material into a cavity of an object, comprising:
 a) a conduit having a conduit inlet port, a conduit outlet port, and an interior passageway extending between the conduit inlet port and the conduit outlet port, the conduit adapted to permit passage of a food material having a first moisture content through the interior passageway from the conduit inlet port to the conduit outlet port;
 b) a fluid injector fluidly connected to the conduit and to a fluid source, the fluid injector adapted to permit injection of a fluid into the interior passageway of the conduit for mixing with the food material passing therethrough to obtain a food material having a second moisture content greater than the first moisture content; and
 c) a nozzle having a nozzle inlet port, a nozzle outlet port, and an interior passageway extending between the nozzle inlet port and the nozzle outlet port, the nozzle being fluidly connected to the conduit and the fluid injector, the nozzle outlet port being adapted to fill the food material having the second moisture content into the cavity of the object, the nozzle outlet port is restricted to generate back pressure in the conduit when the food material having the second moisture content passes through the nozzle outlet port,
 wherein the fluid injector additionally comprises a valve between the conduit and the fluid source for controlling fluid flow through the injector, the valve being biased to a closed position and adapted to permit fluid flow through the fluid injector when the back pressure generated in the conduit by the food material having the second moisture content passing through the nozzle outlet port exceeds a predetermined value.

26. An apparatus according to claim 25, further comprising an axially rotatable screw located within the conduit, fluid injector and nozzle for advancing the food material towards and through the nozzle outlet port.

27. An apparatus according to claim 25, wherein the fluid injector has an annular ring surrounding the conduit outlet port, the conduit has a plurality of apertures positioned around its circumference adjacent the conduit outlet port, and the conduit outlet port is received in the fluid injector so that the plurality of apertures are located within the annular ring.

28. An apparatus according to claim 25, wherein the valve comprises a diaphragm and a valve seat, the diaphragm being in contact with the valve seat while in the closed position to prevent fluid flow through the fluid injector, and the predetermined value is equal to the minimum back pressure on the downstream side of the valve seat required to lift the diaphragm from the valve seat to permit fluid flow through the fluid injector and into the interior passageway of the conduit.

29. An apparatus according to claim 25, further comprising a hopper fluidly connected to the conduit for receiving the food material having the first moisture content and guiding it into the conduit.

* * * * *